(12) United States Patent
Nakano et al.

(10) Patent No.: US 8,960,844 B2
(45) Date of Patent: Feb. 24, 2015

(54) DISCHARGE RATE CONTROL METHOD FOR INK-JET PRINTER, INK SPREAD INSPECTING METHOD, AND ORIENTED FILM FORMING METHOD

(75) Inventors: Teruyuki Nakano, Hiroshima (JP); Yasuhiro Kozawa, Hiroshima (JP)

(73) Assignee: Kabushiki Kaisha Ishiihyoki, Hiroshima (JP)

(*) Notice: Subject to any disclaimer, the term of this patent is extended or adjusted under 35 U.S.C. 154(b) by 543 days.

(21) Appl. No.: 13/309,822

(22) Filed: Dec. 2, 2011

(65) Prior Publication Data

US 2012/0069079 A1    Mar. 22, 2012

Related U.S. Application Data

(62) Division of application No. 11/659,287, filed as application No. PCT/JP2005/015195 on Aug. 22, 2005, now Pat. No. 8,342,636.

(30) Foreign Application Priority Data

Aug. 23, 2004 (JP) ................... 2004-242591
Mar. 31, 2005 (JP) ................... 2005-102753
Jun. 10, 2005 (JP) ................... 2005-171299

(51) Int. Cl.
B41J 29/393     (2006.01)
G02F 1/1337     (2006.01)
B05B 12/08      (2006.01)

(52) U.S. Cl.
CPC ........ *G02F 1/133711* (2013.01); *B05B 12/084* (2013.01)
USPC .......................................................... 347/19

(58) Field of Classification Search
CPC .. B41J 2/0451; B41J 2/04558; B41J 2/04568; B41J 2/04596
See application file for complete search history.

(56) References Cited

U.S. PATENT DOCUMENTS

| 4,872,024 A | 10/1989 | Nagai et al. |
| 5,581,284 A * | 12/1996 | Hermanson ..................... 347/43 |
| 5,889,541 A | 3/1999 | Bobrow et al. |

(Continued)

FOREIGN PATENT DOCUMENTS

| JP | 09-105937 | 4/1997 |
| JP | 9-166783 | 6/1997 |

(Continued)

OTHER PUBLICATIONS

International Search Report issued Dec. 6, 2005 in International Application No. PCT/JP2005/015195.

*Primary Examiner* — Lamson Nguyen

(74) *Attorney, Agent, or Firm* — Wenderoth, Lin & Ponack, L.L.P.

(57) ABSTRACT

An ink-jet type print head discharge inspecting apparatus comprises an inspecting area in which an anomaly in an ink-jet nozzle is inspected according to an impacted droplet pattern of an oriented film material discharged using the ink-jet nozzle, a film forming area in which an oriented film is formed by discharging and impacting the oriented film material using the ink-jet nozzle, and a moving means configured to move the ink-jet nozzle from the inspecting area to the film forming area, or move a position of the inspecting area and a position of the film forming area to a position opposing the ink-jet nozzle, when the impacted droplet pattern is within a predetermined range.

6 Claims, 15 Drawing Sheets

(56) References Cited

U.S. PATENT DOCUMENTS

| | | |
|---|---|---|
| 2003/0030689 A1 | 2/2003 | Hashimoto et al. |
| 2003/0042289 A1 | 3/2003 | Negishi et al. |
| 2003/0222960 A1 | 12/2003 | Takabayashi |

FOREIGN PATENT DOCUMENTS

| | | |
|---|---|---|
| JP | 11-119232 | 4/1999 |
| JP | 2001-42330 | 2/2001 |
| JP | 2002-107282 | 4/2002 |
| JP | 2002-144549 | 5/2002 |
| JP | 2002-174718 | 6/2002 |
| JP | 2002-188986 | 7/2002 |
| JP | 2002-219810 | 8/2002 |
| JP | 2002-280399 | 9/2002 |
| JP | 2003-80694 | 3/2003 |
| JP | 2003-101216 | 4/2003 |
| JP | 2003-136013 | 5/2003 |
| JP | 2003-191467 | 7/2003 |
| JP | 2003-246062 | 9/2003 |
| JP | 2003-265996 | 9/2003 |
| JP | 2003-279723 | 10/2003 |
| JP | 2003-282247 | 10/2003 |
| JP | 2004-126424 | 4/2004 |
| JP | 2004-141758 | 5/2004 |
| JP | 2004-216210 | 8/2004 |
| JP | 2004-216279 | 8/2004 |
| JP | 2004-325087 | 11/2004 |

* cited by examiner

DISCHARGE RATE CONTROL METHOD FOR INK-JET PRINTER, INK SPREAD INSPECTING METHOD, AND ORIENTED FILM FORMING METHOD

This application is a divisional of application Ser. No. 11/659,287, filed Jul. 22, 2008, now U.S. Pat. No. 8,342,636 which is the National Stage of International Application No. PCT/JP2005/015195, filed Aug. 22, 2005.

FIELD OF THE INVENTION

The present invention relates to a technique for maintaining the uniformity of discharge rate of ink, between each nozzle, on coating article from a plurality of nozzles on a print head of an ink-jet printer, a technique for inspecting ink spread, and a technique for forming oriented film on a glass substrate using such ink.

BACKGROUND OF THE INVENTION

In recent years, in addition performing printing by an ink-jet printer on substrate composed of paper, fabric, plastic, ceramic or the like, ink-jet printer is also being used when forming oriented film on transparent glass substrate for equipments such as liquid crystal display equipment, or when coating color filter on transparent glass substrate in organic EL display equipment. Specifically, in the case of liquid crystal display equipment, oriented film material such as transparent PI ink (transparent polyimide ink) or transparent UV ink is discharged and coated on glass substrate (see patent document 1, for example), and in the case of organic EL display equipment, coating material such as, for example, transparent UV ink is discharged and coated on glass substrate.

In such cases, a desirable discharging aspect is such that ink discharges from a plurality of nozzles on a print head of an ink-jet printer are uniform between each nozzle. For example, in the case of a printed material in which color is a main constituent, ink is discharged on coating article having a characteristic that absorbs ink (ink-absorbent characteristic) after taking into consideration on how to produce colors with uniform density from each nozzle. Therefore, the uniformity of color density on the coating article having ink-absorbent characteristic can be easily achieved if the ink droplet discharged from each nozzle is adequately uniform.

However, it is extremely difficult to form a thin film having a uniform thickness on a coating article having a characteristic that does not absorb ink (non ink-absorbent characteristic), for example the glass substrate described above, using conventional ink-jet printer. Therefore, it is not only particularly difficult to form a thin film having a uniform thickness of less than 1 µm on a coating article with such non ink-absorbent characteristic, but even when forming a film having a uniform thickness of 1 µm or more, the discharging aspect of ink droplet from each nozzle is required to be improved precisely.

Attempts had been made to produce an adequately uniform discharging aspect of ink droplet discharged from each nozzle by making fine adjustment on the applied voltage of each nozzle (operating voltage that generates pressure fluctuation in pressure chamber through opening of each nozzle) on a print head of an ink-jet printer, in order to form a film having a uniform film thickness on a coating article. According to patent document 2 below, correction of applied voltage (operating voltage) that adjusts discharging speed of ink droplets from nozzle is disclosed.

Further, when using an ink-jet printer to discharge ink on a coating article having a non ink-absorbent characteristic such as the glass substrate described above, if the spreading of ink droplets after impact is not sufficiently controlled, problems such as the failure of each impacted ink droplets fusing together will occur, hence causing difficulty in forming a good quality film having uniform film thickness on the coating article. Therefore, during the actual forming of film by discharging ink on the coating article having a non ink-absorbent characteristic, it is extremely important to precisely control, in advance, the spreading of the ink droplets after impacting the coating article.

In view of such circumstances, a conventional method for controlling the spreading of ink droplets after impacting a coating article is by dribbling pure water or ink on the surface of the coating article, and thereafter measuring the contact angle α formed by the surface of the periphery 13a of the ink droplet 13 and the surface 12a of the coating article 12 as represented in FIG. 19, using an existing contact angle gauge. Here, the smaller and sharper the contact angle α is, the better hydrophilic property the surface of the coating article possesses and the wider the ink droplet will spread, hence indicating an advantage for forming film having uniform thickness. However, the spreading of the ink droplet does not solely differs according to the characteristic of the ink or the surface aspect of the coating article, but is also influence by other factors such as the size or the discharge rate of the discharged ink droplet. Taking such matters into consideration, it is not difficult to come to a conclusion that the spreading of ink droplet cannot be adequately controlled using the conventional method.

In addition, the forming of oriented film by dribbling oriented film material on the above described glass substrate using ink-jet printer is another know application of ink-jet printer. However, due to the ink-jet method, problems such as nozzle defects, nozzle direction and choking of nozzle by oriented film material occur, and hence causing difficulties in adequately dribbling oriented film material at a required location and in a required quantity.

In order to solve such problem, the droplet state is inspected and oriented film material is added and restored if insufficient, and abandon if unsuitable. As a method for inspecting the droplet state, it is suggested (in patent document 3) to measure the film thickness by passing a substrate, on which an oriented film is formed, through an interference film thickness measuring apparatus; and if it is insufficient, re-dribble oriented film using ink-jet nozzles for reinforcement, and thereafter measuring the film thickness again using the interference film thickness measuring apparatus.

[Patent Document 1] JP No. 2001-42330A
[Patent Document 2] JP No. 2003-191467A
[Patent Document 3] JP No. H9-166783A In recent years, the increase in size of glass substrate, for example, has created needs to increase the coating width and coating length of the ink by ink-jet printer and to decrease the coating time. Under such circumstances, even by adjusting the applied voltage of each nozzle on the print head, which ought to achieve uniform film thickness as described above, various problems exist in the adjustment itself.

In order to increase the coating width of the ink, the coating width of the print head itself and the number of nozzles need to be increased significantly. This inevitably leads to an extremely expensive print head, and the system that controls the print head will also becomes complicated and expensive. Further, the amount of information of the control system will enormously increase, hence creating problems such as an inappropriate decrease in coating speed of ink from each nozzle.

Moreover, even by respectively adjusting the applied voltage of each nozzle in the existing ink-jet printer to achieve a uniform coating of ink droplets, there is limitation in the precision of applied voltage and achieving sufficient uniformity is difficult. For example, even though the uniformity (variability) of an oriented film formed on a glass substrate used in the above-described liquid crystal display equipment is required to be about 2%, the inherent discharge precision of the ink-jet printer used presently is about 5%. Therefore, in order to adjust the applied voltage of each nozzle in such ink-jet printer to achieve a film uniformity of about 2%, the precision (resolution) of the applied voltage needs to be increased. However, this is virtually impossible to realize, and even if realized, the control system will be further complicated and the amount of information overwhelming, consequently leading to a further decrease in the coating speed of ink.

SUMMARY OF THE INVENTION

The first technical object of the present invention is to achieve a precise uniformity of discharge rate of ink discharged from each nozzle on a coating article without being influenced by the adjustment precision of applied voltage of each nozzle, thereby providing an ink-jet printer that does not have a high cost due to complication and overwhelming amount of information of the control system of print head.

With respect to the above-described problem of not being able to adequately control the spreading of ink droplets, the inventors of the present invention discovered a method by using an ink-jet printer that is actually being used and allowing ink droplets of ink that is actually being used to impact an object to be actually coated, which is a coating target, and thereafter measuring the diameter of the ink droplets. According to this method, the spreading of ink droplets on the coating article can be controlled by taking into consideration all the factors such as characteristics of ink, surface aspect of coating article, size of discharged ink droplet, and discharge speed of ink droplet, and a high quality film having uniform thickness can be achieved.

However, even with such method, if the ink is transparent or translucent (hereinafter, "transparent or translucent" may also be referred to as "transparent-like"), measuring the diameter of such ink droplets may be difficult or impossible due to the difficulty or impossibility of visually identifying the ink droplets. Moreover, if the coating article is also transparent-like, such ink droplets will be more difficult to identify and hence further hinders the measuring of the diameter of ink droplets.

Such problem is particularly distinct when oriented film material such as transparent-like PI ink or UV ink is discharged on transparent-like glass substrate in liquid crystal display equipment, or transparent-like UV ink is discharged on transparent-like glass substrate in organic EL display equipment as described above. In addition this, the same problem also occurs when the above-described ink or other transparent-like ink is discharged on transparent-like resin substrate or transparent-like substrate used for fabricating semiconductor devices.

In view of this, the second object of the present invention is to provide a method for adequately inspecting the spreading of transparent-like ink droplet on transparent-like coating article, and forming high quality film having uniform thickness on coating article.

In addition, when inspecting or measuring the oriented film as described above, since the quality of the oriented film is determined after the oriented film is being formed on a substrate, if the oriented film is defective, the whole substrate will have to be abandoned, hence resulting in wastage of material. Further, when performing a correction after the oriented film is formed on the substrate, the thickness of the oriented film is formed in a layer, which may be difficult to maintain a stable quality. Moreover, since the condition of the ink-jet nozzles is not being determined, frequent correction may be required.

The third object of the present invention is to provide an oriented film forming method in which ink-jet nozzles are determined whether there is anomaly or not before oriented film is formed on substrate, thereby enabling early correction of nozzles.

A discharge rate control method for an ink-jet printer related to the present invention for solving the first technical problem includes a film forming step forming a film on a coating article with non ink-absorbent characteristic by discharging an ink on the coating article from a plurality of nozzles of a print head, a film thickness measuring step measuring a film thickness of the film, corresponding to an ink discharge position of each nozzle, formed on the coating article in the film forming step, and a discharge rate correcting step correcting the discharge rate of the ink from each nozzle by increasing or decreasing the discharge rate based on a difference between a target film thickness and the film thickness at the ink discharge position of each nozzle measured in the film thickness measuring step.

According to such method, the coating article with non ink-absorbent characteristic (for example, glass substrate) is effectively used, and ink is actually discharged on the coating film to form a film. Further, the film thickness of the film corresponding to the ink discharge position of each nozzle is measured, and thereafter differences between the results obtained indicating the actual film thickness and a target value indicating a target film thickness are determined according to the ink discharge position of each nozzle, and correction of the discharge rate of ink from each nozzle (in other words, the discharge rate of ink discharged on the coating article from each nozzle) is performed by increasing or decreasing the discharge rate of ink. Therefore, the actual film forming or the like by the print head can be performed after inspecting the variations in the discharge rate of ink from each nozzle in advance and correcting the discharge rate from each nozzle so as to eliminate such variations. Accordingly, unfavorable influence on the amount of data and the control system of the print head, and prevention of the shortening of ink coating time are avoided, and the discharge rate of ink discharged on the coating article from, each nozzle can be kept uniform. Therefore, the needs of increasing the coating width in recent years can be met while maintaining a uniform ink coating. In the case of actually performing the coating after correcting the discharge rate of ink from each nozzle using such method, although it is particularly effective for forming oriented film on transparent glass substrate in liquid crystal display apparatus or the like, or for coating material such as transparent UV ink on transparent glass substrate in organic EL display apparatus, it can also be used to perform printing on substrate made of paper, fabric, plastic, ceramic or the like.

In this case, it is desirable that in the discharge rate correcting step, a correction data for correcting the discharge rate of the ink from each nozzle by increasing or decreasing the discharge rate is created and stored.

Accordingly, the discharge rate of ink from each nozzle is corrected by increasing or decreasing according to the stored correction data. Therefore, during the actual ink coating by the print head, the correction of ink discharge rate may be performed by reading the correction data from a storage means (storage unit) and adjusting each nozzle, and thus can improve the speed and convenience of the process. In addition, for example in the case of an ink-jet printer including a plurality of arranged print heads having a plurality of nozzles, since the correcting value for the discharge rate of ink from each nozzle is stored as correction data, accurately corrected amount of ink can always be discharged from each nozzle even after replacement or relocation of the print heads. Moreover, even as discharge characteristic of each nozzle changes with time, as long as the correction data are recreated and stored, adequate ink can readily be discharged based merely on such renewed correction data.

Further, it is desirable that in the discharge rate correcting step, a distribution of number of droplets of the ink discharged on the coating article from each nozzle is changed.

Accordingly, since the correction of the discharge rate of ink from each nozzle by increasing or decreasing the discharge rate is performed by changing the distribution of number of droplets of the ink discharged on the coating article from each nozzle, the advantage of easy and precise correction can be achieved.

A discharge rate control apparatus for an inkjet printer related to the present invention for solving the first technical problem includes a coating article with non ink-absorbent characteristic and of which surface a film is formed by discharging an ink from a plurality of nozzles of a print head, a film thickness measuring means measuring a film thickness of the film, corresponding to an ink discharge position of each nozzle, formed on the coating article, and a discharge rate correcting means correcting the discharge rate of the ink from each nozzle by increasing or decreasing the discharge rate based on a difference between a target film thickness and the film thickness at the ink discharge position of each nozzle measured by the film thickness measuring means.

According to such apparatus, the film is formed on the coating article with non ink-absorbent characteristic (for example, glass substrate) by the discharging of ink, and the film thickness of the film corresponding to the ink discharge position of each nozzle is measured by operating the film thickness measuring means. Thereafter, by operating the discharge rate correcting means, differences between the results obtained indicating the actual film thickness and a target value indicating a target film thickness are determined according to the ink discharge position of each nozzle, and correction of the discharge rate of ink from each nozzle (in other words, the discharge rate of ink discharged on the coating article from each nozzle) is performed by increasing or decreasing the discharge rate of ink. By performing such correction, effects same as those described above with regard to corresponding matters can be achieved. In addition, matters corresponding to the actual coating after the correction of the discharge rate of ink from each nozzle using such apparatus are also the same as what being described above.

In this case, it is desirable that the discharge rate correcting means further includes a storage means storing a correction data for correcting the discharge rate of each ink by increasing or decreasing the discharge rate.

Even in such case, since the discharge rate of ink from each nozzle is corrected by increasing or decreasing according to the stored correction data, effects same as those described above with regard to corresponding matters can be achieved.

In addition, it is also desirable that a plurality of print heads having the plurality of respective nozzles is adjacently arranged in a nozzle array direction.

Accordingly, even if the coating width of the ink increases with the increase in size of coating article (for example a glass substrate for liquid crystal display apparatus) in recent years, ink can still be adequately discharged on the coating article in a short time and in uniformity with any difficulty.

A method related to the present invention for solving the second technical problem is an ink spread inspecting method for inspecting an ink spread of an ink droplet when the ink droplet impacted a transparent or translucent coating article with non ink-absorbent characteristic, the ink droplet being a transparent or translucent ink discharged from an ink discharging apparatus on the coating article, the method includes discharging the ink droplet on the coating article for a plurality of times such that the ink droplets overlap each other, and inspecting the ink spread on the coating article based on an image of a periphery of a cluster of ink droplets formed by the ink droplets impacting the coating article.

According to such ink spread inspecting method, by comparing the periphery of the cluster of ink droplets, formed by impacting ink droplets on the coating article by discharging the ink droplets a plurality times such that they overlap each other, with the periphery of an ink droplet formed by discharging and impacting the ink droplet on the coating article only once, the degree of protrusion from the surface of the coating article becomes larger and the amount of light reflected or refracted from the periphery is more than the amount of light reflected or refracted from other portions (for example the flat center portion). Therefore, the periphery of the cluster of ink droplets can be clearly identified visually or by an imaging means such as CCD camera, for example, the ink spread can be accurately determined by measuring the diameter or width of the cluster of ink droplets. As a result, a high quality film with a uniform thickness can be formed on the coating article.

In particular, since the surface of the coating article is cleaned in a cleaning step preceding the ink discharging step thereby generating variation in the surface quality of each coating article, the ink spread will not be the same even if the ink discharging apparatus such as ink-jet printer or the ink discharging condition is constant. Therefore, in order to ascertain whether the surface condition of the coating article, the ink discharging apparatus and the ink discharging condition are adequate, it is preferable to actually discharge the ink droplet on the coating article and measure the ink spread as in the present invention. Subsequently, if the film forming process is performed by continuously discharging ink after determining that the spread is adequate, products with high quality film formed on the coating article can be mass produced. In contrast, if the film forming process is performed by continuously discharging ink without determining whether the spread of the ink droplet on the coating article is adequate or not as describe above, large amount of defects will be generated thus leading to problems such as significant decrease in production yield. In view of such matters, according to the present invention, the spread of ink droplet on the coating article can be determined precisely even when a transparent-like ink is discharged on a transparent-like substrate, and hence such significant decrease in production yield can be effectively avoided.

In the above method, it is desirable that during the discharging of the ink droplet on the coating article for a plurality of times such that the ink droplets overlap each other, the ink droplet is discharged such that only a portion of each droplet is overlapped.

Accordingly, when a subsequent ink droplet is discharged after a preceding ink droplet impacted the coating article, a portion of the subsequent ink droplet will impact the surface of the preceding ink droplet while the other portion will impact the surface of the coating article. Therefore, the flight of ink that may be generated when the whole of each ink droplet is overlapped, thus the ink impact is such that the entire subsequent ink droplet overlaps the surface of the preceding ink droplet impacted on the coating article, and the difficulty in inspecting the ink spread due to this are avoided.

In the above method, it is desirable to arrange an imaging means on a side of the coating article where the ink droplet impacted or on a rear side thereof for taking an image of the periphery of the cluster of ink droplets, and inspect the ink spread on the coating article based on the image taken.

Accordingly, since the periphery of the cluster of ink droplets is captured by the imaging means as image, this will favors the measuring of the ink spread diameter or width, for example, the measuring may also be performed automatically. In addition, since the coating article is transparent-like, the imaging means can be disposed on either the side of the coating article where the ink droplet impacted or on the rear side thereof, and hence problems related to the layout is not likely to occur.

In the above invention, if the coating article is a glass substrate used for a liquid crystal display apparatus or an organic EL display apparatus, and the ink is an oriented film material for the liquid crystal display apparatus or a coating material for the organic EL display apparatus, it will provide for the improvement of the quality of liquid crystal display apparatus or an organic EL display apparatus. The above described oriented film material can be transparent-like PI ink (transparent polyimide ink) or transparent-like UV ink, and the above described coating material can be transparent-like UV ink.

Furthermore, in the above invention, if the ink discharging apparatus is an ink-jet printer, the effects described above can be achieved.

An apparatus related to the present invention for solving the second technical problem is an ink spread inspecting apparatus structured such that an ink spread of an ink droplet is inspected when the ink droplet impacted a transparent or translucent coating article with non ink-absorbent characteristic, the ink droplet being a transparent or translucent ink discharged from an ink discharging apparatus on the coating article, and such that the ink droplet is discharged on the coating article for a plurality of times so that the ink droplets overlap each other, and the ink spread on the coating article is inspected based on an image of a periphery of a cluster of ink droplets formed by the ink droplets impacting the coating article.

According to such ink spread inspecting apparatus, by including the features corresponding to the method described above and for the above described reasons, the ink spread can be accurately determined and a high quality film having a uniform thickness can be formed on the coating article, and the significant decrease in product yield can also be avoided.

In this case, when a film material having, for example, a viscosity of 5 to 16 cp and a surface tension of 30 to 40 dyn/cm is used as the above described ink, various above described effects can be achieved significantly.

An oriented film forming method related to the present invention for solving the third technical problem includes an inspecting step inspecting an anomaly in an ink-jet nozzle according to an impacted droplet pattern of an oriented film material (having for example, a viscosity of 5 to 16 cp and a surface tension of 30 to 40 dyn/cm) discharged using the ink-jet nozzle, and a film forming step for an oriented film formed by opposing the ink-jet and a substrate, when the droplet pattern in the inspecting step is within a predetermined range, and discharging and impacting the oriented film material on the substrate using the ink-jet nozzle.

Therefore, unnecessary forming of oriented film on substrate can be prevented since the oriented film forming step will not be performed before the ink-jet nozzle is being determined as normal in the inspecting step.

Further, in the inspecting step, the oriented film material is discharged and impacted on a transparent body using the ink-jet nozzle, and a data of the impacted droplet pattern read from the under surface of the transparent object by an image recognition camera and a data stored in advance are compared to determined if the droplet pattern is within the predetermined range. As a result, since no physical agent is within the discharging range, contamination from the work environment is avoided and inspection can be performed reliably.

Moreover, in the inspecting step, the droplet pattern and the data stored in advance are compared, and a choking of nozzle is determined and displayed when the droplet pattern is not in a predetermined position, a skewed in the flight of droplet is determined and displayed when a position of the droplet pattern is deviated from a predetermined position, and a discharge rate of the ink-jet nozzle is determined and displayed as more than or less than a preset discharge rate when the droplet pattern is larger or smaller than a predetermined size. Therefore, defective oriented film material or ink-jet nozzle can be easily identified and repaired.

An oriented film forming apparatus related to the present invention for solving the third technical problem includes an inspecting area inspecting an anomaly in an ink-jet nozzle according to an impacted droplet pattern of an oriented film material discharged using the ink-jet nozzle, a film forming area forming an oriented film by discharging and impacting the oriented film material using the ink-jet nozzle, and a moving means moving the ink-jet nozzle from the inspecting area to the film forming area, or moving a position of the inspecting area and a position of the film forming area to a position opposing the ink-jet nozzle, when the droplet pattern is within a predetermined range according to the inspection.

According to such apparatus, unnecessary forming of oriented film can be prevented since the ink-jet nozzle will not be moved to the film forming area for oriented film before the ink-jet nozzle is being determined as normal by inspection.

In addition, the inspecting area includes a transparent body disposed below the ink-jet nozzle, an image recognition camera reading the impacted droplet pattern from below the transparent body, a comparison means comparing the droplet pattern read by the image recognition camera and a normal pattern stored in advance, and an evaluating means evaluating if a result from the comparison means is normal or abnormal. Therefore, the data of the impacted droplet pattern read from the wider surface of the transparent object by the image recognition camera and the data stored in advance are compared to determined if the droplet pattern is within the predetermined range. As a result, since no physical agent is within the discharging range, contamination from the work environment is avoided and inspection can be performed reliably.

Moreover, in the inspecting area, the droplet pattern and the data stored in advance are compared, and a choking of nozzle is determined and displayed when the droplet pattern is not in a predetermined position, a skewed in the flight of droplet is determined and displayed when a position of the droplet pattern is deviated from a predetermined position, and a discharge rate of the ink-jet nozzle is determined and displayed as more than or less than a preset discharge rate when the droplet pattern is larger or smaller than a predetermined size. Therefore, defective oriented film material or ink-jet nozzle can be easily identified and repaired.

As described above, according to the discharge rate control method and apparatus for the ink-jet printer related to the present invention for solving the first technical problem, ink is discharged on the coating article with non ink-absorbent characteristic. The film thickness of the film corresponding to the ink discharge position of each nozzle is then measured, and thereafter differences between the results obtained indicating the actual film thickness and a target value indicating a target film thickness are determined according to the ink discharge position of each nozzle, and correction of the discharge rate of ink from each nozzle is performed by increasing or decreasing the discharge rate of ink. As a result, unfavorable influence on the amount of data and the control system of the print head, and prevention of the shortening of ink coating time are avoided, and the discharge rate of ink discharged on the coating article from each nozzle can be kept uniform. Therefore, the needs of increasing the coating width in recent years can be met while maintaining a uniform ink coating.

According to the ink spread inspecting method and apparatus related to the present invention for solving the second technical problem, by comparing the periphery of the cluster of ink droplets, formed by impacting ink droplets on the coating article by discharging the ink droplets a plurality times such that they overlap each other, with the periphery of an ink droplet formed by discharging and impacting the ink droplet on the coating article only once, the amount of light reflected or refracted from the periphery is more than that reflected or refracted from other portions. Therefore, the periphery of the cluster of ink droplets can be clearly identified visually and the ink spread can be accurately determined, and hence a high quality film with a uniform thickness can be formed on the coating article. Moreover, since the film forming process can be performed by continuously discharging ink after determining that the spread is adequate, high grade products with high quality film formed on the coating article can be mass produced, and production yield can be improved.

According to the oriented film forming method and apparatus related to the present invention for solving the third technical problem, since material can be supply and nozzle adjusted promptly by displaying defective ink-jet nozzle from droplet condition and responding in advance, wastage of material can be prevented, and yield of the factory improved.

BRIEF DESCRIPTION OF DRAWINGS

FIG. 12($b$) is a schematic side view thereof.

FIG. 16($b$) is a schematic side view thereof.

Figure 1:
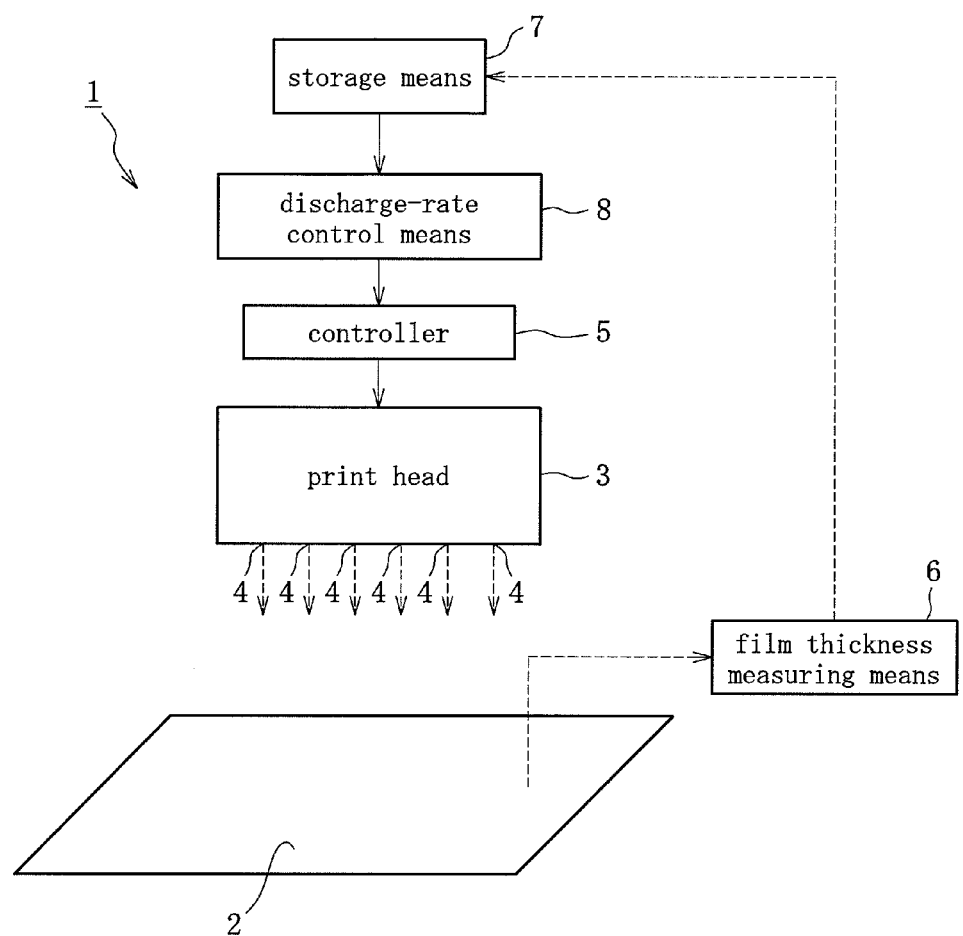
FIG. 1 is a schematic diagram of a discharge-rate control apparatus of an ink-jet printer related to the first embodiment of the present invention.

EXPLANATION OF REFERENCES 1 discharge-rate control apparatus of ink-jet printer
2 glass substrate (coating article)
3 print head
4 nozzles
6 film thickness measuring means 7 storage means
8 discharge-rate control means
A droplet
B film
Ba target film thickness

DETAILED DESCRIPTION OF THE INVENTION

Hereinafter, embodiments of the present invention will be described with reference to the drawings.

First Embodiment

FIGS. 1 to 11 are examples representing the first embodiment of the present invention. As represented in FIG. 1, a discharge-rate control apparatus 1 of an ink-jet printer includes, as main components, a transparent glass substrate 2 used in a liquid crystal display equipment and having non ink-absorbent characteristic, a controller 5 for controlling the quantity of ink discharged from a plurality of nozzles 4 of a print head 3, and a film thickness measuring means 6 for measuring, with respect to the discharge position of each nozzle 4, the thickness of a film formed on the glass substrate 2 by the ink discharged from the print head 3. The discharge-rate control apparatus 1 further includes a storage means 7 for storing correction data corresponding to the difference between a target film thickness and a film thickness determined by the film thickness measuring means 6 at the ink discharge position of each nozzle 4, and a discharge-rate correction means 8 that retrieves the correction data stored in the storage means 7 and corrects the quantity of ink discharged from each nozzle 4 of the print head 3 based on the controller 5.

A more specific structure of the discharge-rate control apparatus 1 having such features and its operating procedure will be described in details below.

Figure 2:
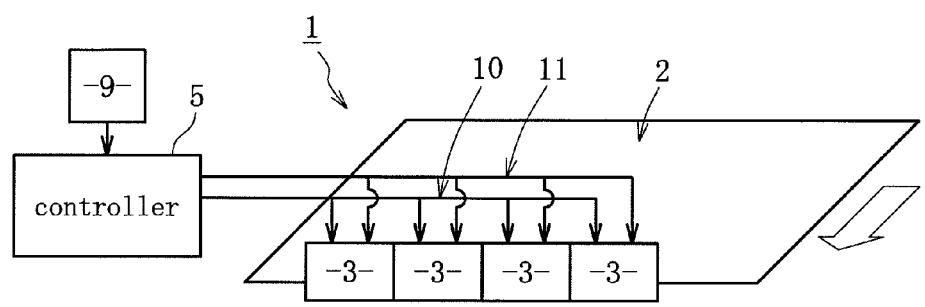
FIG. 2 is a schematic diagram representing a specific structure of the discharge-rate control apparatus.

As represented in FIG. 2, a plurality of the print heads 3 (4 are shown in the drawing) having a plurality of nozzles are arranged in the direction in which the nozzles are arranged in the ink-jet printer used in the first embodiment. With regard to the operating procedure, a computer 9 first computes an applied voltage for the print heads 3 from the number of ink droplets corresponding to a target film thickness (a target value for a film thickness). By sending, as a command signal, this computed value to the controller 5, a signal indicating an applied voltage is in turn sent from the controller 5 to the print heads 3 via an applied voltage line 10, thereby adjusting the discharge quantity of ink discharged from each nozzle of the print heads 3. In addition, a signal indicating the discharge of ink droplets from any nozzle on any print head 3 is sent from the controller 5 via a discharge data line 11.

Figure 3:
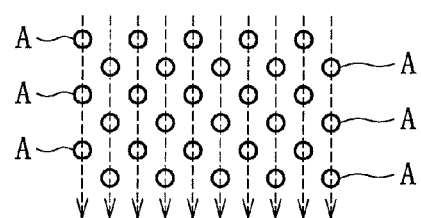
FIG. 3 is a schematic plan view representing an impact state of ink droplets discharged from the discharge-rate control apparatus.
Figure 4:
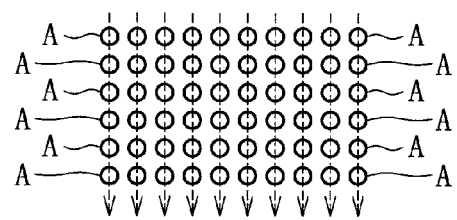
FIG. 4 is a schematic plan view representing an impact state of ink droplets discharged from the discharge-rate control apparatus.

Under such condition, ink droplets are discharged on the glass substrate 2 from every nozzle of every ink head 3 in a discharge quantity adjusted as described above. In this case, the discharge of ink on the glass substrate 2 is performed, as represented in FIG. 3, such that each droplet A discharged from adjacent nozzles is staggered by ½ a pitch. Therefore, the ink droplets A of 50% of the entire discharge quantity of all nozzles will be in the state as represented in the drawing while impacting the glass substrate 2 (refer to as a 50% discharge pattern). In contrast to this, when the pitch between each droplet A discharged from adjacent nozzle is not staggered and no lapse is presence as shown in FIG. 4, ink droplets A corresponding to 100% of the entire discharge quantity of all nozzles will be in the state as represented in the drawing while impacting a coating article (refer to as a 100% discharge pattern).

Figure 5:
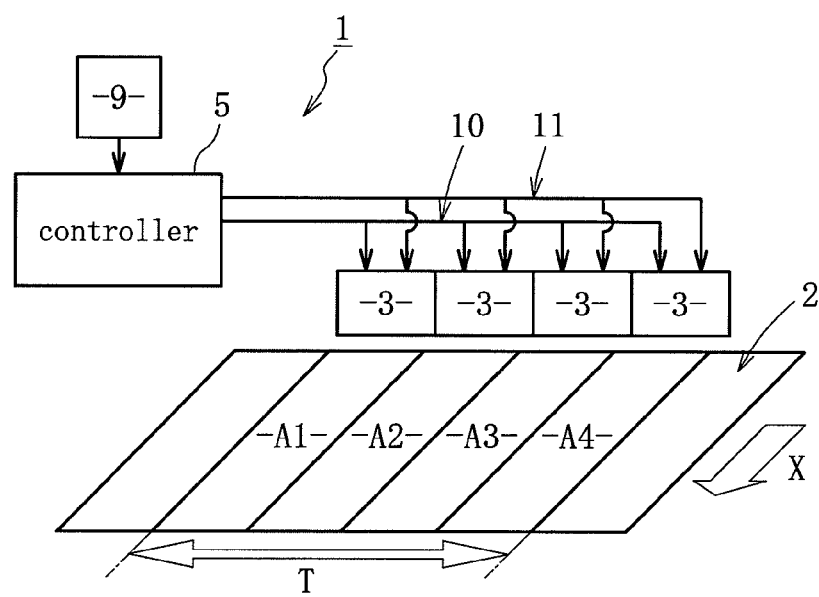
FIG. 5 is a schematic diagram representing a state in which a film is formed on a glass substrate by the discharge-rate control apparatus.
Figure 6:
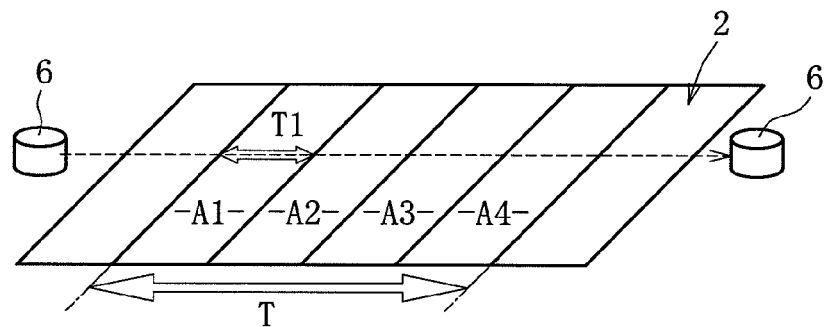
FIG. 6 is a schematic diagram representing a state in which the thickness of a film formed on a glass substrate by the discharge-rate control apparatus is being measured.

As represented in FIG. 5, by the time the discharging of ink from the 4 print heads 3 in a 50% discharge pattern, together with the movement over the glass substrate 2 in the direction indicated by the arrow X, is completed, a thin film is formed on the glass substrate 2 in the first to fourth coating regions A1, A2, A3, A4 and across the wide coating width T. Thereafter, as represented in FIG. 6, the film thickness is measured in the direction in which the nozzles are arranged from a starting edge of the first coating region A1 within a coating width T1 to an ending edge of the fourth coating region A4 using the film thickness measuring means 6, thereby determining whether the film thickness in the discharge position of any nozzle 4 on any print head 3 is thin or thick.

Figure 7:
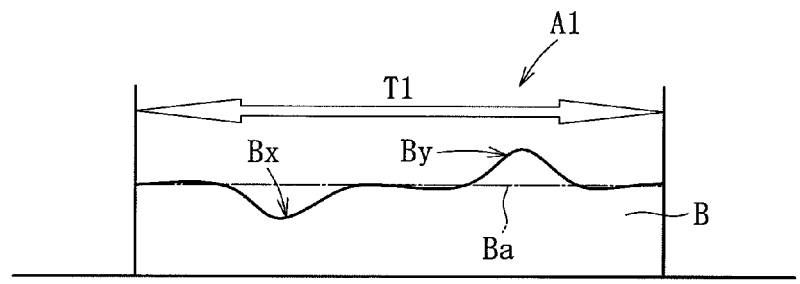
FIG. 7 is a cross-sectional diagram representing a film formed on a glass substrate by the discharge-rate control apparatus.
Figure 8:
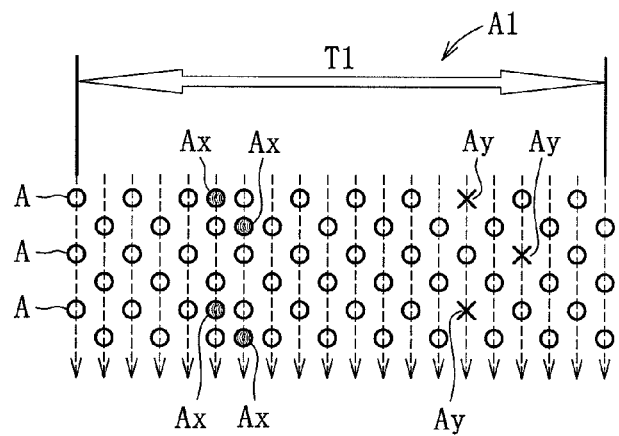
FIG. 8 is a schematic plan view representing an impact state of ink droplets discharged after correction by the discharge-rate control apparatus.

FIG. 7 is a cross-sectional diagram representing a state in which a film B is formed in the first coating region A1 of the above described coating width T1. As represented in the same diagram, when the film B in the first coating region A1 has an insufficient film thickness portion Bx or an excess film thickness portion By with respect to the above described target film thickness Ba, the ink droplets from the respective corresponding nozzle are corrected by increasing or decreasing accordingly. Specifically and such as in the distribution of droplets A on the glass substrate 2 represented in FIG. 8, the number of ink droplets discharging from the nozzle corresponding to the insufficient film thickness portion Bx is increased (refer to as adding-to-space) according to the droplet portions indicated by the reference character Ax, and the number of ink droplets discharging from the nozzle corresponding to the excess film thickness portion By is decreased (refer to as subtracting-from-space) according to the droplet portions indicated by the reference character Ay. Such correction of the distribution of droplets A on the glass substrate 2 is performed on all coating regions between the first coating region and the fourth coating region A1-A4.

Figure 9:
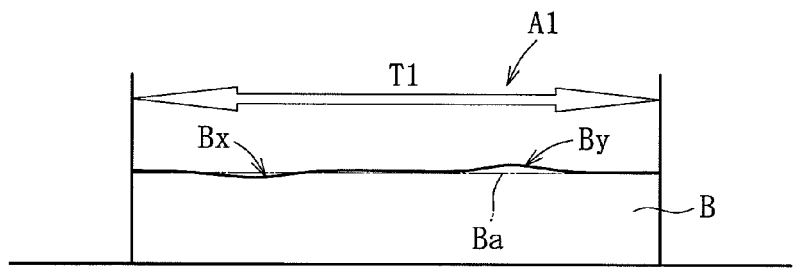
FIG. 9 is a cross-sectional diagram representing a film formed on a glass substrate after correction by the discharge-rate control apparatus.

By performing the above correction, the insufficient film thickness portion Bx and the excess film thickness portion By close in to the target film thickness Ba as represented in FIG. 9. If necessary, the operations described based on FIGS. 4 to 8 are repeated to bring the insufficient film thickness portion Bx and the excess film thickness portion By as close to the target film thickness Ba as possible, thereby increasing the uniformity of the film thickness in all coating regions between the first coating region and the fourth coating region A1-A4 on the glass substrate 2.

Figure 10:
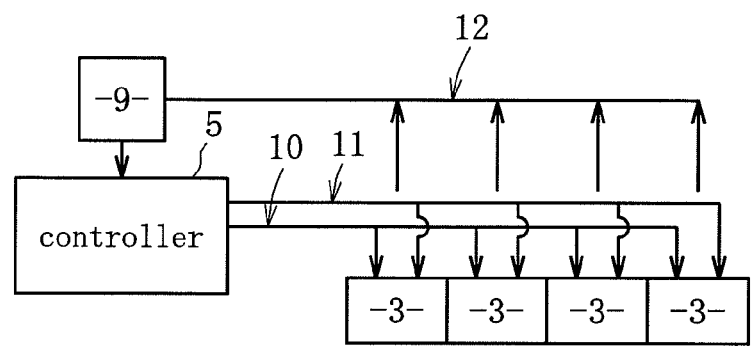
FIG. 10 is a schematic diagram representing an operation of the discharge-rate control apparatus.
Figure 11:
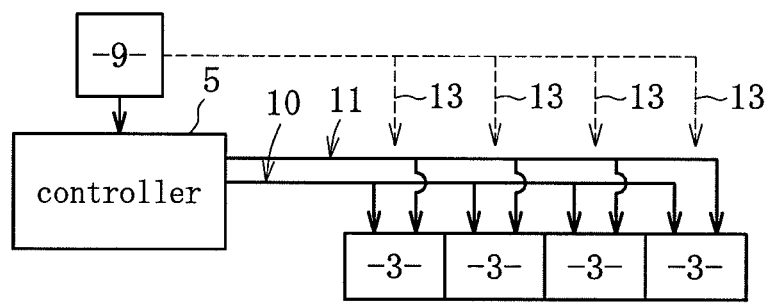
FIG. 11 is a schematic diagram representing an operation of the discharge-rate control apparatus.

Thereafter, a discharge pattern representing the distribution of the number of ink droplets on the glass substrate 2 from all the nozzles of the print head 3, including the nozzles of which number of ink droplets on the substrate 2 is corrected as described above, is stored as correction data in the storage means 7, which is provided within the computer 9, via a data writing line 12 represented in FIG. 10. Therefore, when for example the plurality of print heads 3 are used with a change in arranging sequence, the stored correction data is retrieved by the discharge-rate correction means 8 included within the computer 9, and written 13 on each print head 3 from the discharge-rate correction means 8 as represented in FIG. 11, thereby allowing each print head 3 to readily achieve a high precision coating of uniform film.

Next, after setting the number of ink droplets (ink droplets corresponding to the distribution of droplets on the glass substrate 2 based on the correction data) from all the nozzles of all the print heads 3 based on such correction data, typically the coating of oriented film on transparent glass substrate used for liquid crystal display equipment or the coating of color filter on transparent glass substrate used for organic EL display equipment is performed. In addition, printing on substrate made of paper, fabric, plastic, ceramic or the like may also be performed.

Second Embodiment

Figure 12A:
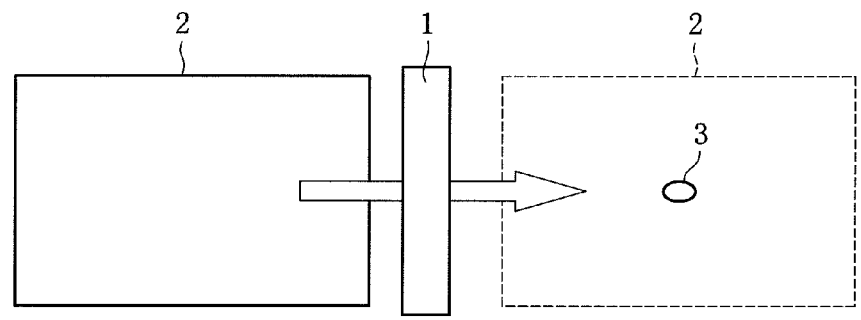
FIG. 12($a$) is a schematic plan view representing an ink-jet print head and its periphery, the ink-jet print head being a component of an ink spread inspecting apparatus related to the second embodiment of the present invention.
Figure 12B:
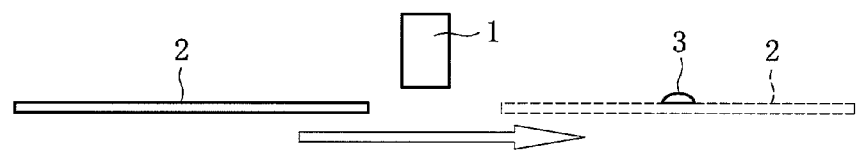
Figure 13:
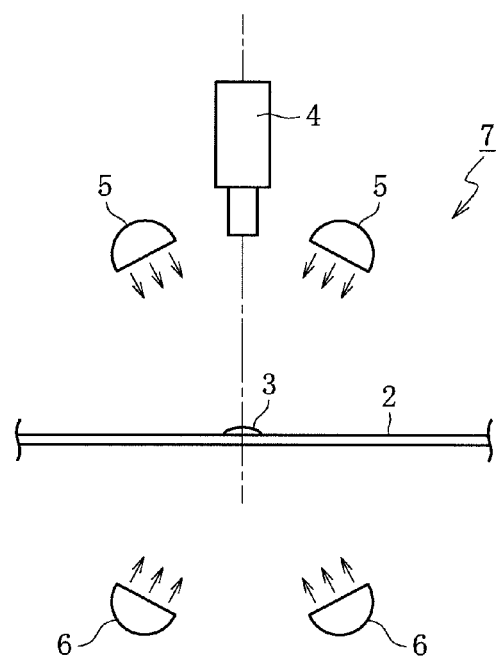
FIG. 13 is a schematic side view representing a structure of an inspecting part of the ink spread inspecting apparatus.

FIGS. 12 to 18 are examples representing the second embodiment of the present invention. FIG. 12(a) is a schematic plan view representing components of an ink-spread inspecting apparatus including an ink-jet print head 1, a transparent-like glass substrate 2 drawn in solid lines and serving as a coating article before being coated by ink droplet, and the glass substrate 2 drawn in dotted lines after being coated by ink droplets (a cluster of ink droplets 3), and FIG. 12(b) is a schematic side view representing each component 1, 2 in, the same state. FIG. 13 is a schematic side view representing an arrangement of an inspecting camera 4 and a plurality of lightings 5, 6, which are components of the ink-spread inspecting apparatus.

In the second embodiment, as represented in FIGS. 12(a), (b), when a glass substrate 2 below an ink-jet print head 1, which is being maintained in a fixed position, is moved in the direction of the arrow, ink droplets are discharged on the surface of the glass substrate 2, and by the time the glass substrate 2 is moved into the position indicated by the dotted lines, the spreading of the cluster of ink droplets (an aggregate of ink droplets formed by overlapping each other) 3 impacts on the surface of the glass substrate 2 will be inspected.

The structure of an inspection unit 7 for inspecting the above described spreading of the cluster of ink droplets 3 includes, as represented in FIG. 13, the inspecting camera 4 composed of a CCD camera provided on the side of the glass substrate 2 where the cluster of ink droplets 3 impacted the substrate, specifically, provided directly above the cluster of ink droplets 3 on the glass substrate 2 and pointing downwards, the two lightings 5 provided on the side of the glass substrate 2 where the cluster of ink droplets 3 impacted the substrate, so as to symmetrically irradiates light on the cluster of ink droplets 3 from diagonally above, and two lightings 6 provided on the side of the glass substrate 2 opposite to the side where the cluster of ink droplets 3 impacted the substrate, so as to symmetrically irradiates light on the cluster of ink droplets 3 from diagonally below.

Figure 14:
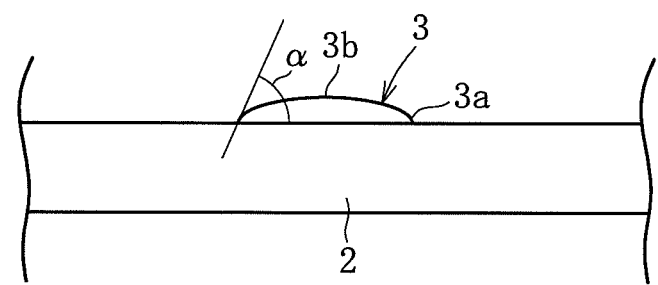
FIG. 14 is a schematic side view representing a cluster of ink droplets on a coating article which is an inspection target of the ink spread inspecting apparatus.
Figure 15:
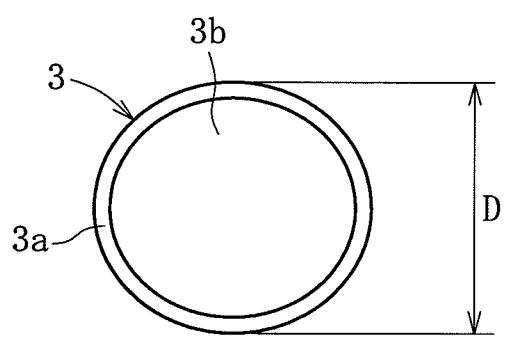
FIG. 15 is a schematic plan view representing the shape of a cluster of ink droplets which is an inspection target of the ink spread inspecting apparatus.
Figure 19:
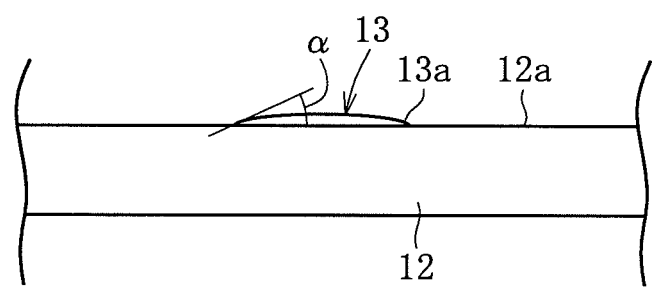
FIG. 19 is a schematic side view representing an ink droplet on a coating article where the ink droplet is only being discharged once.

In this case, the cluster of ink droplets 3 on the glass substrate 2 is formed when ink droplets are being discharged and overlapped at the same position for multiple times, and the periphery 3a of the cluster of ink droplets 3 curves drastically as compared to center portion 3b which curves gradually as represented in FIG. 14. In other words, the contact angle α of the periphery 3a of the cluster of ink droplets 3 with respect to the glass substrate 2 is much larger as compared to the contact angle α of the ink droplet 13 that is only being discharged once represented in the previously described FIG. 19. Therefore, when the cluster of ink droplets 3 is irradiated by light from the lightings 5, 6 and its image captured by the inspecting camera 4, the circular center portion 3b represented in FIG. 15 is relatively flat and hence transparent and cannot be visually identified, as compared to the ring-shaped periphery 3a represented in the same diagram from which relatively more light is reflected or refracted, and hence can be visually identified in a white up-lifted state. Here, by measuring the diameter D of this cluster of ink droplets 3, the spreading of the ink actually used in the ink-jet printer with respect to the glass substrate 2 can be predetermined.

Figure 16A:
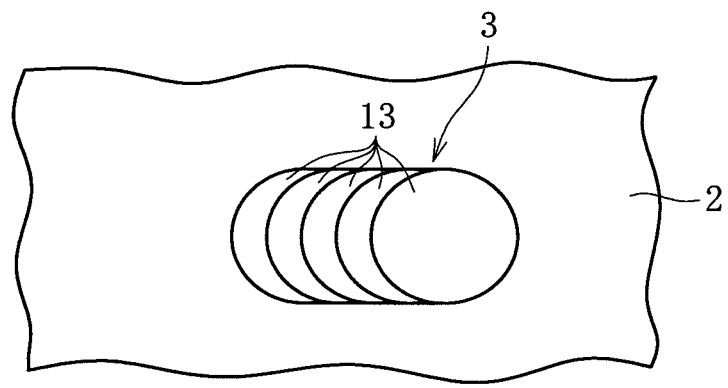
FIG. 16($a$) is a schematic plan view representing another example of a cluster of ink droplets on a coating article which is an inspection target of the ink spread inspecting apparatus.
Figure 16B:
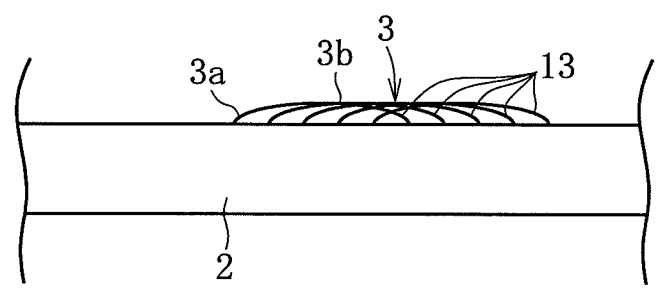
Figure 17:
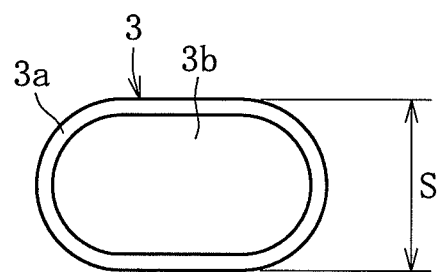
FIG. 17 is a schematic plan view representing the shape of the other example of a cluster of ink droplets which is an inspection target of the ink spread inspecting apparatus.

Depending on the characteristic of the ink being used, there is a possibility that when ink droplets are being discharged and overlapped at the same position for multiple times as above, subsequent ink droplets will bounced off precedent ink droplets and the periphery of the cluster of ink droplets does not curve as much as described above. When this happened, the periphery will not be in a white up-lifted state, and hence the spreading of the ink cannot be determined by the inspecting camera. In this case, as represented in FIG. 16(a), (b) the plurality of ink droplets 13 is discharged for multiple times while moving in one direction such that only a portion of the ink droplets 13 is overlapped, hence a portion of the impact position of each ink droplet 13 is overlapped. As a result, an image of an over-shaped transparent center portion 3b and a white up-lifted over-shaped ring periphery 3a represented in FIG. 17 can be captured by the inspecting camera. Here, by using this image represented in FIG. 17 and measuring the diameter S of the cluster of ink droplets 3, the spreading of the ink actually used in the ink-jet printer with respect to the glass substrate 2 can be predetermined.

Figure 18:
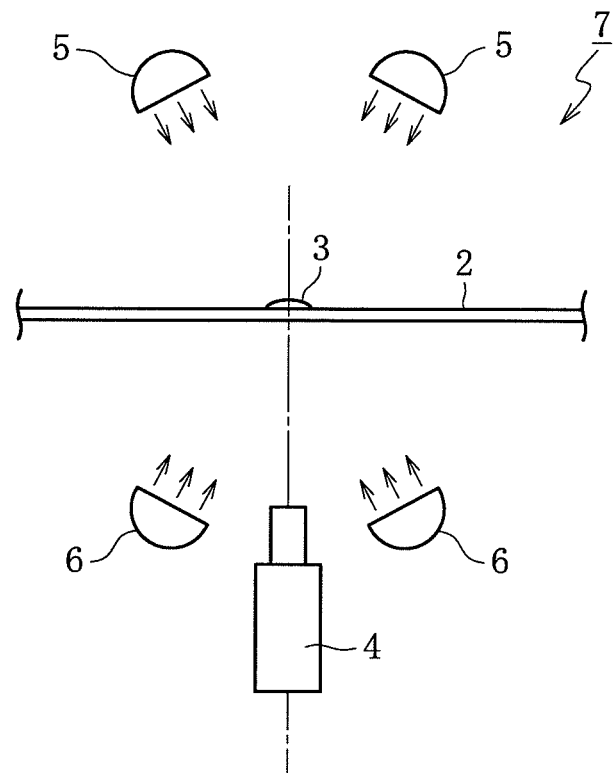
FIG. 18 is a schematic side view representing another example of an inspecting part of the ink spread inspecting apparatus.

FIG. 18 represents another example of the inspecting unit 7, and the lightings 5, 6 are arranged as previously described, while the inspecting camera 4 is arranged on the side of the glass substrate 2 opposite to the side where the cluster of ink droplets 3 impacted the substrate, specifically, arranged directly below the cluster of ink droplets 3 on the glass substrate 2 and pointing upwards. Even when the lightings 5, 6 and the inspecting camera 4 are in such arrangement, under the same circumstances as previously described, the periphery 3a of the cluster of ink droplets 3 can be captured in a white up-lifted state, and the spreading of the ink on the glass substrate 2 can be predetermined precisely.

The ink-spread inspecting apparatus related to the above embodiment is particularly useful when discharging oriented film material such as transparent-like PI ink or UV ink on transparent-like glass substrate for liquid crystal display equipment or the like, or when discharging transparent-like UV ink on transparent-like glass substrate for organic EL display equipment. Apart from these, the ink-spread inspecting apparatus is also applicable when discharging the above-described inks or other transparent-like ink on transparent-like resin substrate or transparent-like substrate used for fabricating semiconductor devices.

Third Embodiment

Figure 20:
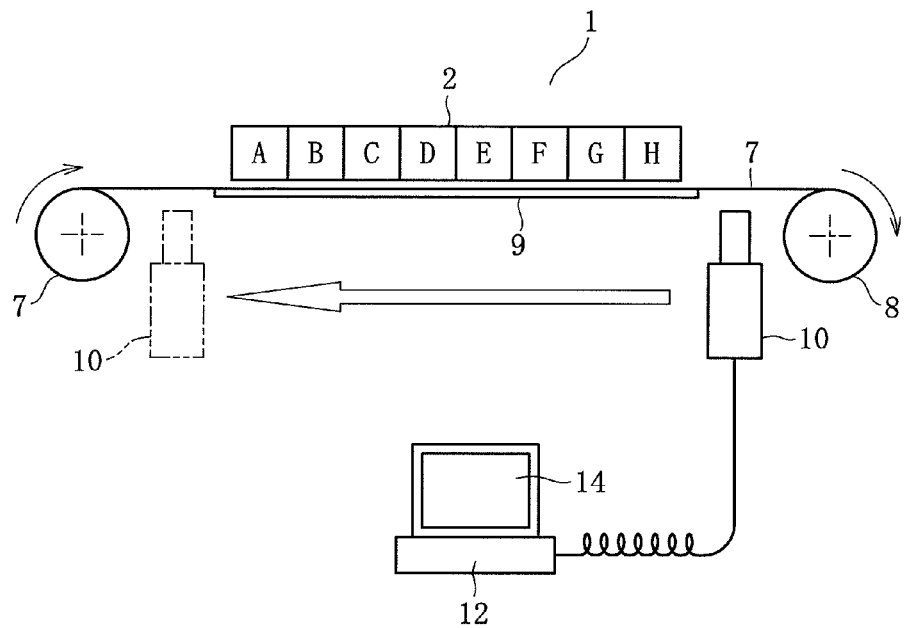
FIG. 20 is a schematic side view of an ink-jet type print head discharge inspecting apparatus related to the third embodiment of the present invention.
Figure 21:
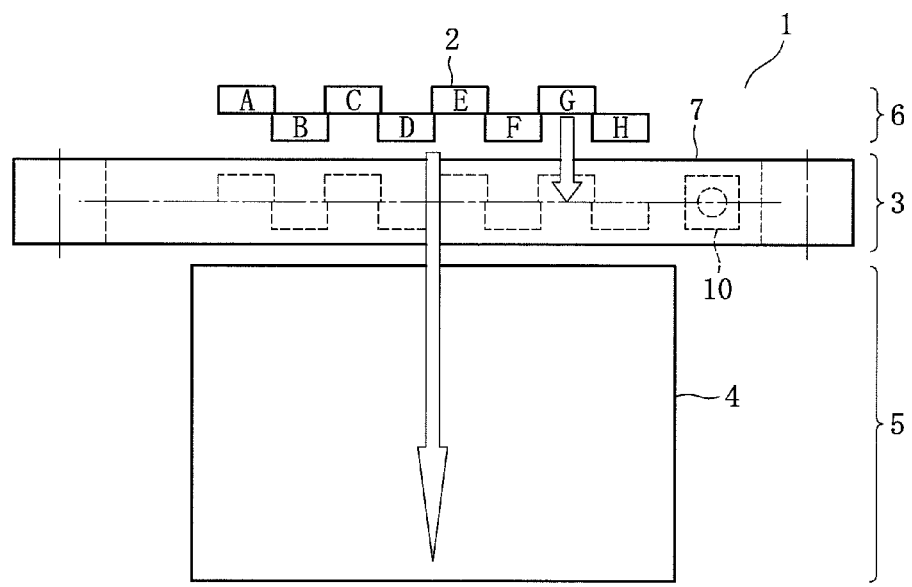
FIG. 21 is a plan view of the ink-jet type print head discharge inspecting apparatus.
Figure 22:
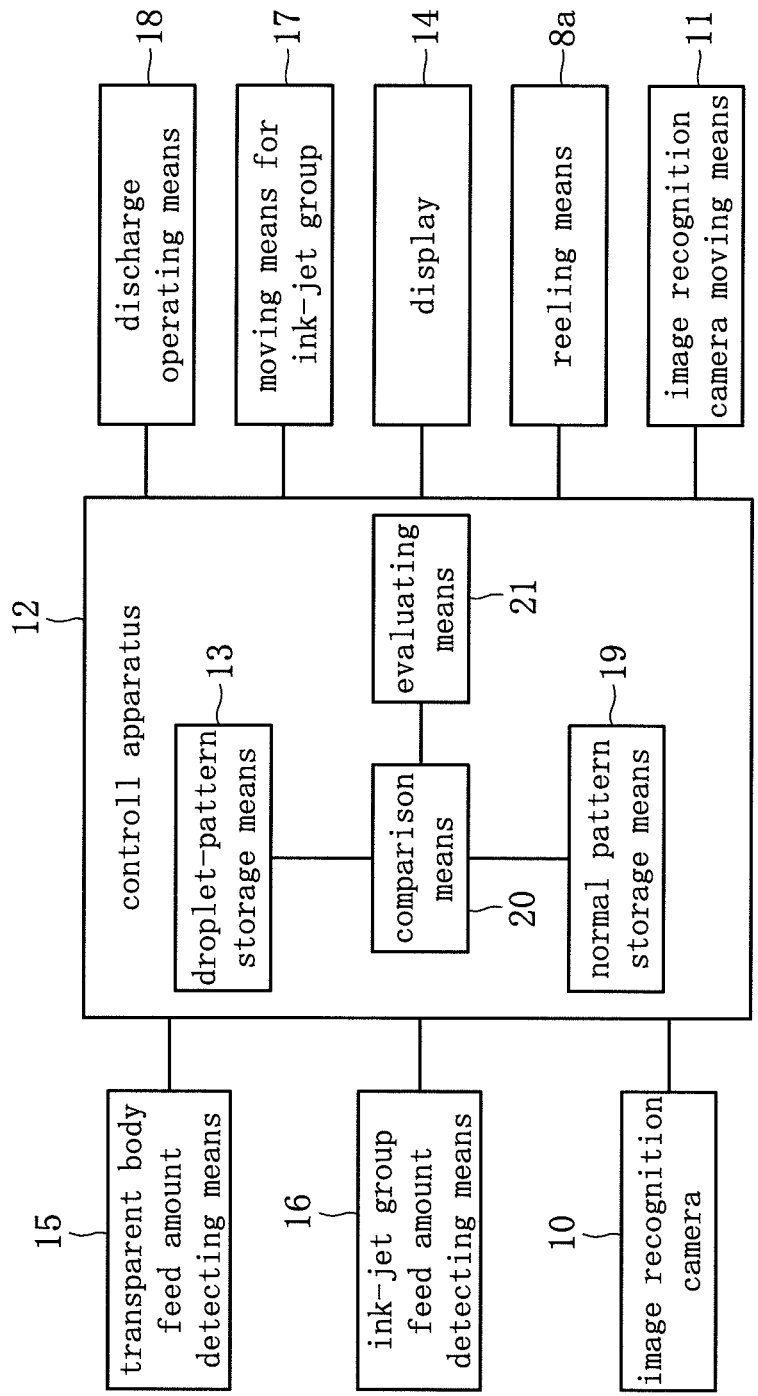
FIG. 22 is a block diagram illustrating operation of main components of the ink-jet type print head discharge inspecting apparatus.
Figure 23:
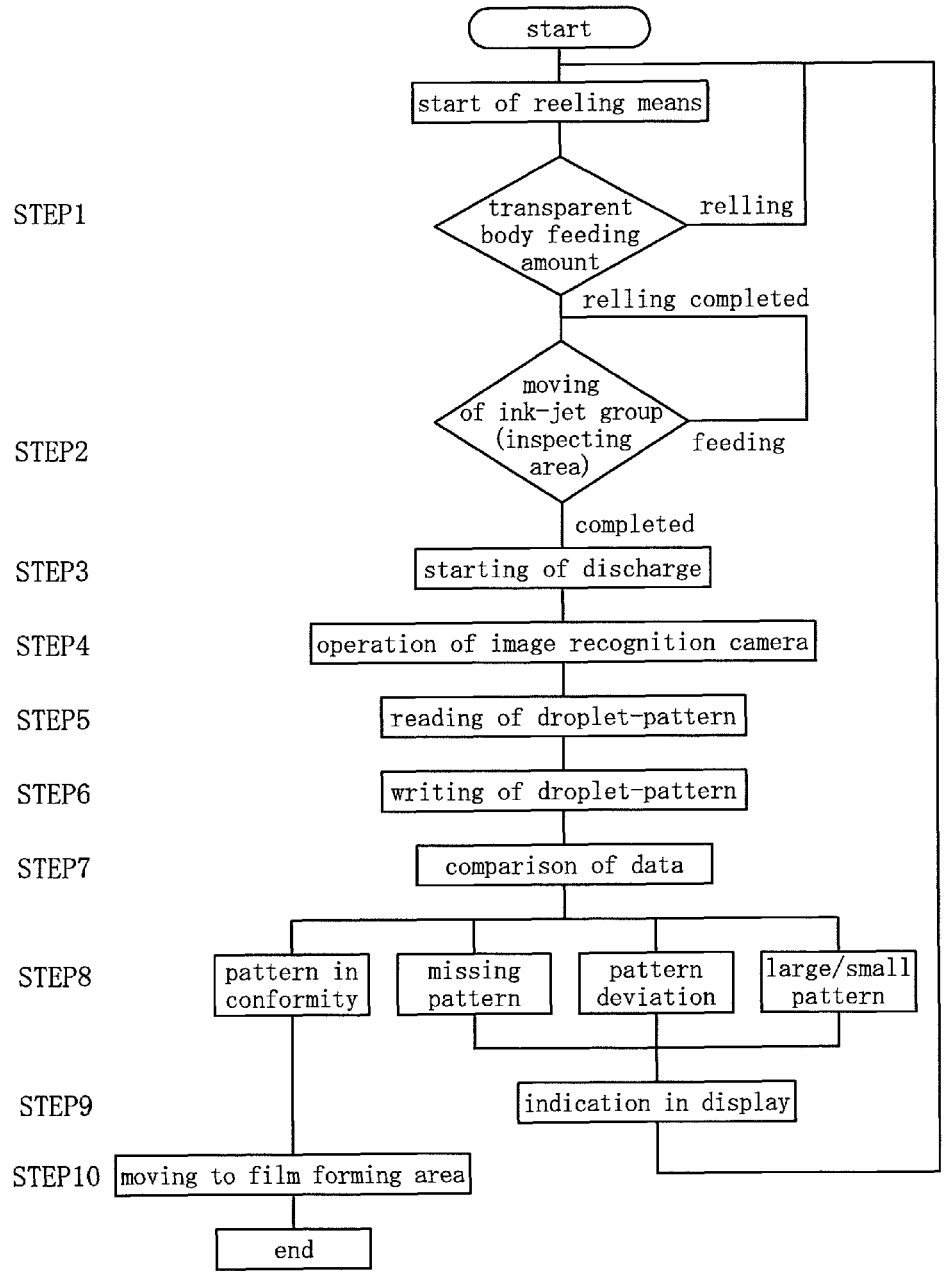
FIG. 23 is a main-components flow chart of FIG. 22.
Figure 24:
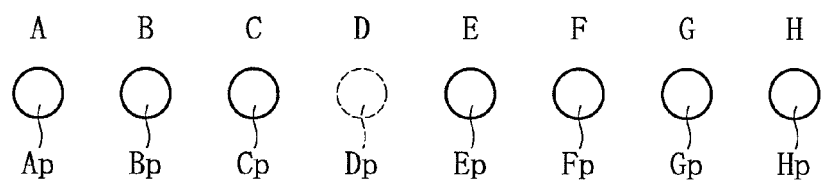
FIG. 24 represents droplet patterns when choking of ink-jet nozzles is being detected by the ink-jet type print head discharge inspecting apparatus.
Figure 25:
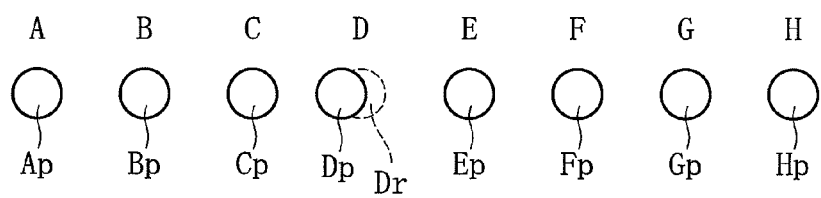
FIG. 25 represents droplet patterns when skewed discharging of ink-jet nozzles is being detected by the ink-jet type print head discharge inspecting apparatus.
Figure 26:
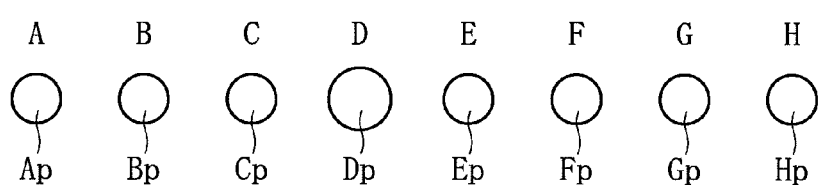
FIG. 26 represents droplet patterns when the quantity of droplets from ink-jet nozzles is being detected by the ink-jet type print head discharge inspecting apparatus.

FIGS. 20 to 26 are examples representing the third embodiment of the present invention. FIG. 20 is a schematic side view of an ink-jet type print head discharge inspecting apparatus. FIG. 21 is a top view of FIG. 20, FIG. 22 is a block diagram illustrating operation of main components of the third embodiment, FIG. 23 is a main-components flowchart of FIG. 22, FIG. 24 represents droplet patterns when choking of ink-jet nozzles is being detected, FIG. 25 represents droplet patterns when skewed discharging of ink-jet nozzles is being detected, and FIG. 26 represents droplet patterns when the quantity of droplets from ink-jet nozzles is being detected.

An oriented film forming apparatus 1 includes an inspecting area 3 in which droplets of oriented film material are discharged by an ink-jet group 2 composed of 8 ink-jet nozzles (A, B, C, D, E, F, G, H) and anomalies of the ink-jet nozzles are inspected according to the pattern of the droplets Ap, Bp, Cp, Dp, Ep, Fp, Gp, Hp, and a film forming area 5 in which the oriented film material is discharged on a substrate 4 by the ink-jet group 2 to form an oriented film.

The ink-jet group 2 is moved from the position of the inspecting area 3 to the position of the film forming area 5 by a driving structure (not shown in drawing). The ink-jet group 2 is being moved over 3 positions, namely the inspecting area 3, the film forming area 5, and a withdrawal area 6 into which the ink-jet group 2 is withdrawn from the other 2 areas 3, 4 (the state where the ink-jet group 2 is above FIG. 21).

The ink-jet group 2 moves from the top to the bottom of FIG. 21 as indicated by the arrow, and ink is discharged on the substrate 4 as the ink-jet group 2 moves over the film forming area 5. When view from the substrate 4 in FIG. 21, the first row of ink discharge is formed at the upper most portion and the subsequent $n^{th}$ rows are formed below.

The inspecting area 3 is positioned between the film forming area 5 and the withdrawal area 6, and the condition of each ink-jet nozzle A to H of the ink-jet group 2 is inspected in the inspecting area 3 before the ink-jet group 2 moves into the film forming area 5.

A transparent body 7 composed of a film is provided in the inspecting area 3 such that the transparent body 7 moves in a direction that traverses the direction of movement of the ink-jet group 2. The transparent body 7 is wound up in a roll-shaped and rotatably attached to the left in the FIG. 20. A roller 8 for rolling-up is provided in a position longer than the length of the ink-jet group 2 on the right in the FIG. 20. The roller 8 reel-off the span transparent body 7 by a reeling means 8a, and the reeling means 8a moves the transparent body 7 until it exceed at least the ink-jet nozzles A to H in one movement.

A transparent substrate 9 longer than the length of the ink-jet nozzles A to H is provided below the transparent body 7 and is evenly formed such that the discharge of ink from the ink-jet group 2 on the transparent body 7 is performed on a flat surface.

An image recognition camera 10 may be a generally known CCD camera, and is moved by an image recognition camera moving means 11 (indicated by the double dotted line in FIG. 20 after being moved) in a direction that intersects a direction in which the ink-jet group 2 moves below the transparent body 7 and the transparent substrate 9. Hence, the image recognition camera 10 is moved along the length of the transparent body 7.

Together with such movement, the droplet pattern viewing from below of droplets Ap, Bp, Cp, Dp, Ep, Fp, Gp, Hp after impacting the transparent body 7 is stored in a droplet-pattern storage means 13 of a control apparatus 12. The control apparatus 12 may be a personal computer, and includes a display 14 serving as a display means that can display various conditions. At this time, droplet Ap corresponds to nozzle A, droplet Bp corresponds to nozzle B, . . . , droplet Hp corresponds to nozzle H.

Next, movements of the ink-jet group 2, the image recognition camera 10 and the control apparatus 12 over the inspecting area 3 are described with reference to FIGS. 22 and 23.

The control apparatus 12 is input with data from the image recognition camera 10, a transparent body feed amount detecting means 15 and an ink-jet group feed amount detecting means 16. The transparent body feed amount detecting means 15 and the ink-jet group feed amount detecting means 16 may supply positional data via an ON/OFF switch, or may perform interval detection by a timer.

The control apparatus 12 also controls a moving means 17 for an ink-jet group 2, a discharging means 18 for ink-jet nozzles A to H, the display 14, the image recognition camera moving means 11 and the reeling means 8a for transparent body.

The control apparatus 12 includes a CPU within, and also includes the droplet-pattern storage means 13 for storing droplet pattern of droplets Ap, Bp, Cp, Dp, Ep, Fp, Gp, Hp after impacting the transparent body 7, a normal pattern storage means 19, a comparison means 20 for comparing the pattern of impacted droplets Ap, Bp, Cp, Dp, Ep, Fp, Gp, Hp and the normal pattern, and an evaluating means 21 for evaluating the condition of the ink-jet nozzles A to H according to the result from the comparison means 20.

The operation starts at the beginning of a work day, after a break or at any time. In STEP 1, a signal is sent from the control apparatus 12 to the reeling means 8a and the reeling means 8a moves until a predetermined length is reeled-off. Thereafter, as STEP 2, the moving means 17 for the ink-jet group 2 is operated and stopped at the inspecting area 3. Next, in STEP 3, oriented film material is discharged on the transparent body 7 at a predetermined time interval by the discharging means 18 for ink-jet nozzles A to U.

In STEP 4, the image recognition camera 10 positioned below the transparent body 8 is operated, and the image recognition camera moving means 11 is operated. In STEP 5, data of the pattern of droplets Ap, Bp, Cp, Dp, Ep, Fp, Gp, Hp formed by the ink-jet nozzles A to H are read, and thereafter, as STEP 6, stored in the droplet-pattern storage means 13.

In STEP 7, the data stored in the droplet-pattern storage means 13 and a pre-registered data from the normal pattern storage means 19 are read by the comparison means 20, and the difference is sent to the evaluating means 21.

In STEP 8, missing pattern, pattern deviation and large/small pattern are evaluated by the evaluating means 21, and then displayed on the display 14 as STEP 9.

In the case of missing pattern, therefore droplet pattern is not in a predetermined position (the circle Dp indicated by dotted line in FIG. 24 is the missing portion), it will be evaluated as failure of impact and thus displayed as choking of nozzle. In the case where the number of missing portions is large, there is a possibility that the oriented film material has finished and a prompt to replace oriented film material will be displayed.

In the case of pattern deviation, therefore droplet pattern is deviated from a predetermined position (the circle indicated by dotted line in FIG. 25 is the deviated pattern of Dp with respect to the normal position Dr), it will be evaluated and displayed as a skewed in the flight of droplet. In the case of large/small pattern, therefore droplet pattern is larger or smaller than a predetermined size (Dp, Fp pattern in FIG. 26), it will be evaluated and displayed as the discharge rate of the ink-jet nozzle is more or less than a preset discharge rate.

Accordingly, the refill of oriented film material or repair of nozzle can be performed after reviewing the displayed result of the display 14. In particular, since the evaluation is based on image from directly below, even if any one of nozzles A to H is inclined, the condition can be readily captured. Moreover, since the ink-jet group 2 is the only object moving over the transparent body 7, the surrounding dust will not fall on the transparent body 7, and thus error in operation caused by contamination is not likely to occur.

Only after the pattern in STEP 8 is in conformity, then as STEP 10, the ink-jet group 2 is moved over the film forming area 5, and oriented film is precisely formed by sequentially discharging oriented film material on the substrate 4, therefore eliminating the wastage of expensive material, such as the substrate, and the requirement for repair.

Figure 27:
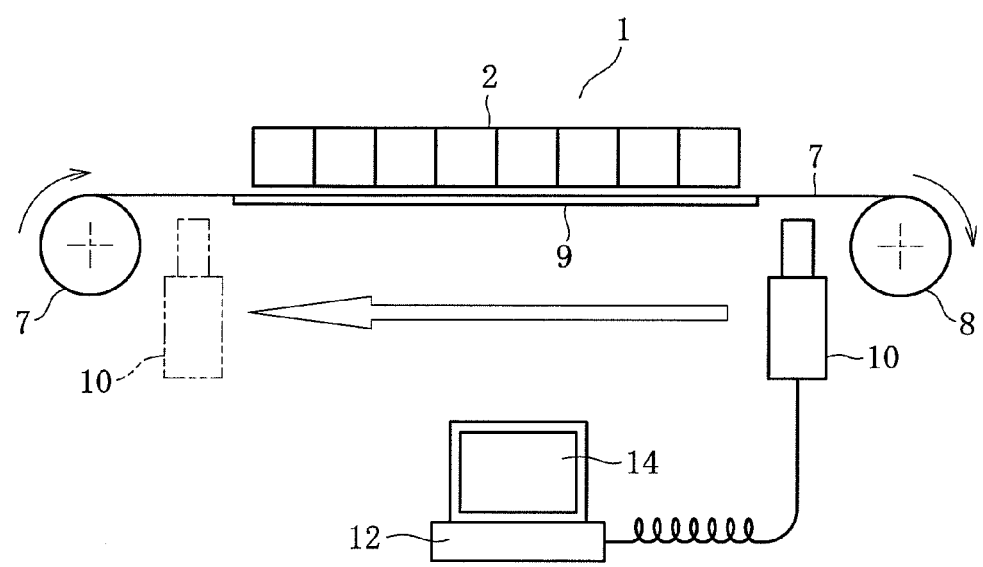
FIG. 27 is a schematic side view representing a modification of the ink-jet type print head discharge inspecting apparatus.
Figure 28:
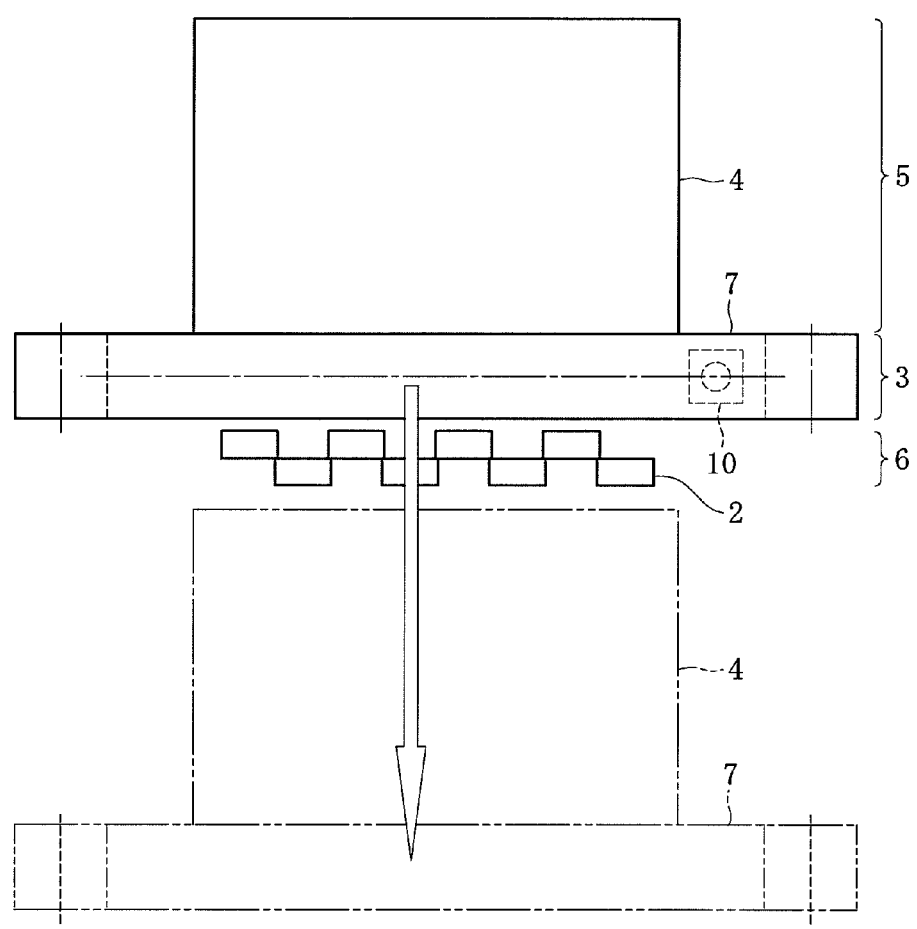
FIG. 28 is a plan view of the ink-jet type print head discharge inspecting apparatus represented in FIG. 27.

In the third embodiment, the structure is such that the ink-jet group 2 moves from the position of the inspecting area 3 to the position of the film forming area 5. However, as a replacement of this and as represented in FIGS. 27 and 28, it may be structured such that the position of the ink-jet group 2 is fixed and the inspecting area 3 and the film forming area 5 are arranged in succession so that the inspecting area 3 moves in front the film forming area 5 with respect to the ink-jet group 2. In the case of such structure, the movement of the inspecting area 3 and the film forming area 5 are represented by the double dotted line in FIG. 28. In this case, the inspection in the inspecting area 3 is the same as described above.

In the third embodiment, droplet discharging process in the film forming area is performed after inspection in the inspecting area 3 is completed. However, the operation in the inspecting area 3 may not be performed constantly, but may also be performed at the start of the main operation or after a few times of film foaming.

In addition, although the transparent body is being described as a film, it may also be a plate. It is also obvious that abnormal condition of nozzle may be displayed even without film forming process or film forming area.

What is claimed is:

1. An ink-jet type print head discharge inspecting apparatus comprising:
    an inspecting area in which an anomaly in an ink-jet nozzle is inspected according to an impacted droplet pattern of an oriented film material discharged using the ink-jet nozzle;
    a film forming area in which an oriented film is formed by discharging and impacting the oriented film material using the ink-jet nozzle;
    a moving means configured to move the ink-jet nozzle from the inspecting area to the film forming area, or move a position of the inspecting area and a position of the film forming area to a position opposing the ink-jet nozzle, when the impacted droplet pattern is within a predetermined range; and
    a transparent body in the inspecting area below the ink-jet nozzle, the transparent body being configured to receive the oriented film formed by discharging and impacting the oriented film material, and being rolled up in a roll shape.

2. The ink-jet type print head discharge inspecting apparatus of claim 1, wherein the inspecting area includes the transparent body disposed below the ink-jet nozzle, an image recognition camera configured to read the impacted droplet pattern from below the transparent body, a comparison means configured to compare the impacted droplet pattern read by the image recognition camera and a normal pattern stored in advance, and an evaluating means configured to evaluate if a result from the comparison means is normal or abnormal.

3. The ink-jet type print head discharge inspecting apparatus of claim 2, further comprising a display apparatus configured to determine and display a choking of the ink-jet nozzle when the impacted droplet pattern is not in a predetermined position according to the evaluating means.

4. The ink-jet type print head discharge inspecting apparatus of claim 2, further comprising a display apparatus configured to determine and display a skew in a flight of a droplet of the impacted droplet pattern when a position of the impacted droplet pattern deviates from a predetermined position according to the evaluating means.

5. The ink-jet type print head discharge inspecting apparatus of claim 2, further comprising a display apparatus configured to determine and display a discharge rate of the ink-jet nozzle as more than or less than a preset discharge rate when the impacted droplet pattern is larger or smaller than a predetermined size according to the evaluating means.

6. The ink-jet type print head discharge inspecting apparatus of claim 1, further comprising a roller configured to roll the transparent body up into the roll shape.

\* \* \* \* \*